United States Patent Office 3,564,363
Patented Feb. 16, 1971

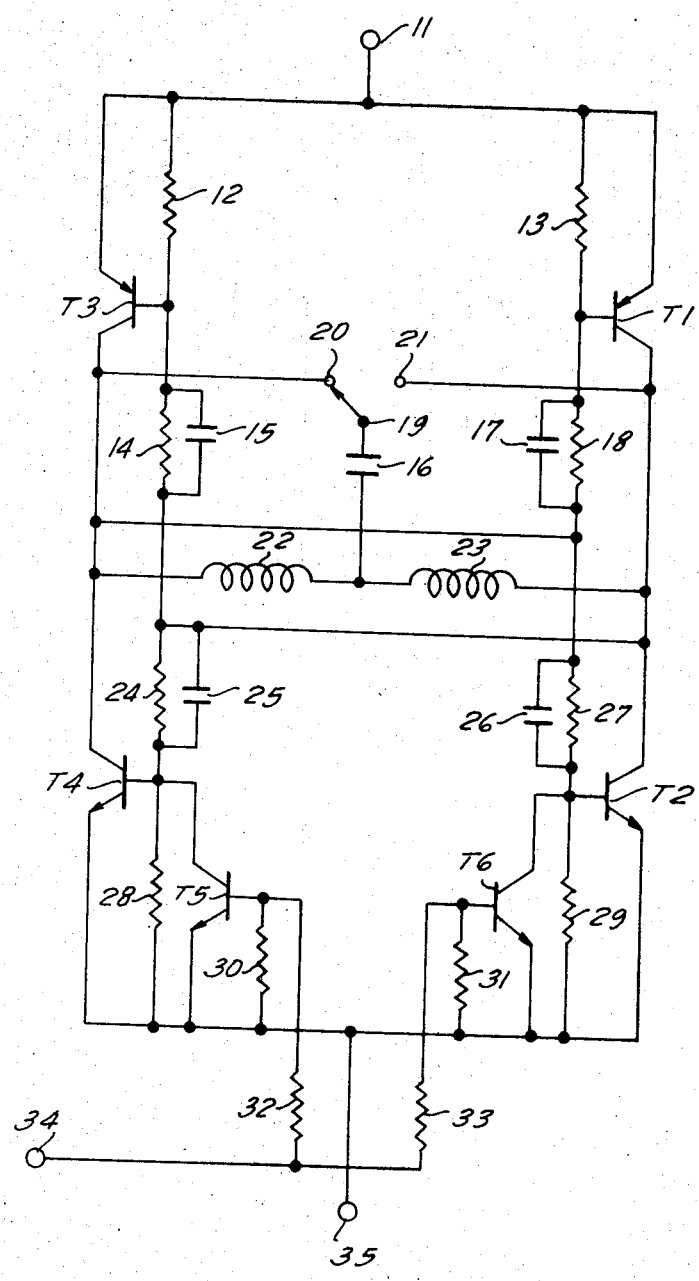

3,564,363
ELECTRIC STEPPING MOTOR CONTROL CIRCUIT
William R. Scholtz, Scotia, N.Y., assignor to Salient Electronics, Inc., Rexford, N.Y., a corporation of New York
Filed Sept. 9, 1968, Ser. No. 758,501
Int. Cl. H02k 37/00
U.S. Cl. 318—138                                  5 Claims

ABSTRACT OF THE DISCLOSURE

A bistable circuit for controlling one or more permanent magnet A.C. motors at a synchronous stepping rate includes two pairs of transistors electrically connected to the motor windings which, when energized, produce one of two stable states wherein one pair of transistors is conducting and the second pair is non-conducting. Also included in the circuit are resistors connected between base and emitter of the transistors for controlling voltage input, a phase shifting capacitor connected to the motor windings, switching means for determining the stepping direction of the motors, and a pair of transistors adapted to receive an external electrical impulse so that, when pulsed, the circuit shifts states and produces a leading current in the motor winding causing the motor to step in a predetermined direction.

BACKGROUND OF THE INVENTION

This invention relates to a control circuit for an electric motor and, more particularly, to a bistable control circuit for a permanent magnet A.C. stepping motor, which circuit is of improved design and requires only a single source of D.C. power with reference to the common circuit ground. In addition, this invention reduces to a large degree the number of active components in the circuit thus minimizing maintenance and repair costs.

BRIEF SUMMARY

I have developed a circuit for controlling one or more permanent magnet A.C. motors at a synchronous stepping rate. The circuit is bistable in operation and is responsive to an electrical pulsed input.

It is an object of this invention to provide a control circuit for a permanent magnet A.C. stepping motor.

Another object of this invention is to provide a control circuit responsive to an electrical pulsed input which can cause one or more motors to step in a predetermined direction at a synchronous rate.

Other objects and advantages of the invention will become apparent from the following description taken in conjunction with the accompanying drawings in which:

FIG. 1 shows an electrical schematic diagram of a preferred embodiment of my invention.

DESCRIPTION OF THE INVENTION

In accordance with the present invention, a bistable circuit for controlling one or more permanent magnet A.C. stepping motors at a synchronous stepping rate by shifting between two stable states when successively pulsed by external signals includes a plurality of transistors for electrical connection to the motor windings so that a voltage applied to the transistors will trigger one of two stable states wherein preselected transistors are conducting while others are nonconducting. By the use of the term "nonconducting" I mean that the forward biasing voltage applied to the transistor is below the minimum or threshold voltage required to overcome the potential barrier at the junction to permit current to flow. Similarly, by the use of the term "conducting" I mean that the forward biasing voltage is above the threshold value thus permitting current to cross the junction of the transistor.

The circuit includes first and second transistors forming a branch of the circuit for connection to the motor windings along with third and fourth transistors forming a second branch of the circuit for connection to the motor windings. Current paths through the motor windings are thus established between the first and fourth transistors to define a first stable conducting state and the second and third transistors to define a second stable conducting state. First and second resistive elements are connected in series and respectively electrically connected between base and emitter of the first and second transistors for determining current flow in the respective transistors. Third and fourth resistive elements are connected in series and respectively electrically connected between base and emitter of the third and fourth transistors for determining current flow in the respective transistors. The combination of first and second resistive elements and third and fourth resistive elements form separate branches of a parallel circuit. A phase shifting capacitor is electrically connected to the motor windings. A pair of transistors are electrically connected to the bases of the second and fourth transistors and are adapted to receive an external electrical pulse. When pulsed, these transistors will conduct current causing the circuit to shift states whereby a leading current is produced in the motor windings causing the motors to step in a predetermined direction.

Also included in the circuit are switching means for determining the direction of current flow in the windings and a pair of transistors adapted to receive an external electrical pulse. When an electrical pulse is impressed on the circuit, the latter pair of transistors will conduct current causing the circuit to shift states wherein the quiescent state conducting transistors become nonconducting and the quiescent state nonconducting transistors become conducting so that the coupling means, e.g. a phase shifting capacitor, causes a leading current to be produced in the motor winding causing the motor to step in a predetermined direction, e.g. clockwise. When the circuit is pulsed again, the circuit returns to the earlier state and a leading current of the opposite polarity is produced through the motor winding causing the motor to step again in the same predetermined direction. By reversing the switching means, a pulsed input will cause a leading current in the opposite direction in the motor winding in the same manner as just described resulting however in the motor to step in the opposite, e.g. counter-clockwise direction.

PREFERRED EMBODIMENT

Referring now to the drawing, FIG. 1 shows a schematic diagram of the circuit contemplated by this invention. The circuit is bistable and can only maintain one of two possible stable states. When a voltage is applied between terminals 11 and 35, current will flow through resistive elements 12, 14, 24, 28 forming one branch of a parallel circuit and resistors 13, 18, 27 and 29 forming the second branch of the circuit. Capacitors 15, 17, 25 and 26 are connected across resistors 14, 24, 18 and 27, respectively, to increase the signal at the bases of transistors T1, T2, T3 and T4 during the phase shifting period of transition. Paired transistors T1 and T4, and T2 and T3 determine which of the two possible bistable states of the circuit will predominate in the quiescent condition. If, for purposes of illustrating this embodiment of the invention, transistor T2 is considered as having the highest power gain, transistors T2 and T3 will be conducting and transistors T1 and T4 will be nonconducting. When a voltage is applied at 11, base currents of substantially the same values will flow in transistors T1, T2, T3 and T4 and will cause a greater current to flow through transistor T2.

This current flow will cause the voltage at the junction of resistors 14 and 24 to drop. This decrease in voltage will cause transistor T3 to become more conducting, and transistor T4 to become nonconducting since the voltage has fallen below the threshold value. When transistor T3 begins to increase its current output, the voltage at the junction of resistors 18 and 27 increases and approaches the value of the voltage applied at 11. This increase in voltage causes transistor T2 to further increase its current output and transistor T1 to become nonconducting since the voltage has fallen below the threshold value. This action is regenerative and the circuit stabilizes very rapidly with transistors T2 and T3 in a conducting state and transistors T1 and T4 in a nonconducting state. The quiescent state thus produced in the circuit is stable until pulsed by an external signal.

Control switch 19 is shown electrically connected to contact point 20. When a positive electrical pulse is applied at input 34, current will flow through resistor 32 into transistor T5 and through resistor 33 into transistor T6. Resistors 32 and 30 and 33 and 31 control the voltage in the base circuits of transistors T5 and T6. If the quiescent state is such that transistors T1 and T4 are conducting and transistors T2 and T3 are nonconducting, the current flow through transistors T5 and T6 will cause transistors T4 to become nonconducting. When transistor T4 becomes nonconducting, the voltage at its collector then rises toward the value of the voltage impressed at 11. This increasing voltage is coupled to the base of transistor T1 through capacitor 17 and resistor 18 causing transistor T1 to become nonconducting. At the same time, the rising voltage at the collector of transistor T4 is coupled to the base of transistor T2 through capacitor 26 and resistor 27 causing transistor T2 to become conducting and transistor T1 to become nonconducting. This causes the voltage at the collector of transistor T2 to fall from a voltage approaching that impressed at 11 to ground potential very rapidly. This decrease in voltage is coupled through capacitor 15 and resistor 14, and through capacitor 25 and resistor 24 causing transistor T3 to become conducting and transistor T4 to become nonconducting. At this stage of operation the voltages at the collectors of transistors T1 and T2 are decreasing.

When control switch 19 is electrically connected to contact point 20, the rising voltages at the collectors of transistors T3 and T4 are momentarily coupled about motor windings 22 by phase shifting capacitor 16. This produces a condition where the voltage across motor winding 23 is rising at the connection with capacitor 16 and falling at the collector connection of transistors T1 and T2. This effect causes a build up of current in the motor winding 23. As the charge coupled through capacitor 16 is used up, the voltage across, and the current through, winding 22 increases. Consequently, a leading current is produced in motor winding 23 causing the motor to develop torque and to step in a predetermined direction, e.g. a clockwise direction. When a second pulse is applied at 34, the circuit reverses and transistors T1 and T4 become conducting while transistors T2 and T3 become nonconducting which produces a leading current of the opposite polarity through the motor winding 23 causing another step in the same predetermined direction, e.g. the clockwise direction.

If control switch 19 is electrically connected to contact point 21 and an electrical pulse is applied at 34, a leading current is produced in motor winding 22 in a manner similar to that described above. However, since switch 19 is electrically connected to contact point 21, the motor will step in the opposite direction, e.g. in a counterclockwise direction.

Although my invention does not rely upon any particular theory for its operation, the above explanation of the circuit operation both in the transient and steady state condition is included to explain, to the best of my understanding, what happens in the bistable circuit in the quiescent condition as well as the condition in which the motor control circuit is responding to an external pulse.

Although the present invention has been described in conjunction with preferred embodiments, it is to be understood that modifications and variations may be resorted to without departing from the spirit and scope of the invention as those skilled in the art will readily understand Such modifications and variations are considered to be within the purview and scope of the invention and appended claims.

What is claimed is:

1. A bistable circuit for controlling one or more permanent magnet A.C. motors at a synchronous stepping rate by shifting between two stable states when successively pulsed by external signals comprises:

motor windings of said motor;

first and second transistors forming a first branch of a circuit for connection to the motor windings;

third and fourth transistors forming a second branch of the circuit for connection to the motor windings so that current paths through the motor windings are established between the first and fourth transistors to define a first stable conducting state and the second and third transistors to define a second stable conducting state;

first and second resistive elements connected in series and respectively electrically connected between base and emitter of said first and second transistors for determining current flow in the respective transistors;

third and fourth resistive elements connected in series and respectively electrically connected between base and emitter of said third and fourth transistors for determining current flow in the respective transistors, the combination of first and second resistive elements and third and fourth resistive elements forming separate branches of a parallel circuit;

a phase shifting capacitor electrically connected to the motor windings; and a pair of transistors electrically connected to the bases of the second and fourth transistors and adapted to receive an external electrical pulse, and, when pulsed, will conduct current causing the circuit to shift states whereby a leading current is produced in the motor windings causing the motor to step in a predetermined direction.

2. A control circuit in accordance with claim 1 including switching means for determining the direction of current flow in the motor windings.

3. A control circuit in accordance with claim 2 wherein the phase shifting capacitor is electrically connected between the control switch and the motor windings.

4. A control circuit in accordance with claim 3 including means for coupling the applied voltage to the base circuit of each transistor connected to the motor windings.

5. A control circuit in accordance with claim 4 wherein the coupling means comprise a capacitor and resistor.

References Cited
UNITED STATES PATENTS

| | | | |
|---|---|---|---|
| 3,165,684 | 1/1965 | Ensink et al. | 318—138 |
| 3,243,677 | 3/1966 | Cannalte et al. | 318—138 |
| 3,280,395 | 10/1966 | Madsen | 318—138 |
| 3,309,592 | 3/1967 | Favre | 318—138 |

GLEN R. SIMMONS, Primary Examiner

U.S. Cl. X.R.

313—439